(12) United States Patent
Grazziotin et al.

(10) Patent No.: US 12,271,843 B2
(45) Date of Patent: Apr. 8, 2025

(54) SYSTEMS AND PROCESSES OF POSITION FULFILLMENT

(71) Applicant: ADP, Inc., Roseland, NJ (US)

(72) Inventors: Pablo Grazziotin, Porto Alegre (BR); Lucas Boscaini, Porto Alegre (BR); Leonardo Hoffmann, Porto Alegre (BR); Filipe Kovalski, Porto Alegre (BR)

(73) Assignee: ADP, Inc., Roseland, NJ (US)

( * ) Notice: Subject to any disclaimer, the term of this patent is extended or adjusted under 35 U.S.C. 154(b) by 0 days.

(21) Appl. No.: 17/369,262

(22) Filed: Jul. 7, 2021

(65) Prior Publication Data

US 2023/0010910 A1    Jan. 12, 2023

(51) Int. Cl.
*G06Q 10/0631* (2023.01)
*G06F 40/205* (2020.01)

(52) U.S. Cl.
CPC ... *G06Q 10/063112* (2013.01); *G06F 40/205* (2020.01)

(58) Field of Classification Search
CPC .............. G06Q 10/063112; G06F 40/205
USPC ........................................ 705/7.14
See application file for complete search history.

(56) References Cited

U.S. PATENT DOCUMENTS

| | | | |
|---|---|---|---|
| 2008/0016054 A1* | 1/2008 | Liska | G06Q 10/10 707/999.005 |
| 2013/0031090 A1* | 1/2013 | Posse | G06F 16/248 707/723 |
| 2013/0212032 A1* | 8/2013 | Cox | G06Q 10/1053 705/321 |
| 2015/0186846 A1* | 7/2015 | Menon | G06Q 10/1053 705/321 |
| 2016/0292238 A1* | 10/2016 | Qiao | G06F 16/248 |
| 2018/0307750 A1* | 10/2018 | Gupta | G06F 16/9535 |
| 2019/0104113 A1* | 4/2019 | Pei | H04L 9/321 |
| 2020/0234606 A1* | 7/2020 | Anders | G09B 7/00 |
| 2021/0233029 A1* | 7/2021 | Mittal | G06Q 10/1053 |
| 2022/0374838 A1* | 11/2022 | Houston | G06Q 10/1053 |

* cited by examiner

*Primary Examiner* — Abdallah A El-Hage Hassan
(74) *Attorney, Agent, or Firm* — Foley & Lardner LLP (57) ABSTRACT

The present disclosure relates generally to systems and processes for position fulfillment and, more particularly, to systems and methods of identifying and matching human resources to an open employment position within an organization. The method includes: obtaining, by a computer system, one or more profiles from one or more data sources; analyzing, by the computer system, the one or more profiles to parse attributes and find similarities and/or recurring occurrences in the parsed attributes; normalizing the parsed attributes based on the at least one similarities and recurring occurrences; and matching the normalized attributes to attributes of an open position.

10 Claims, 9 Drawing Sheets

SYSTEMS AND PROCESSES OF POSITION FULFILLMENT

TECHNICAL FIELD

The present disclosure relates generally to systems and processes for position fulfillment and, more particularly, to systems and processes of identifying and matching human resources to an open employment position within an organization.

BACKGROUND

"Position Fulfillment" is a term that refers to a human resource (HR) employee's role in recruitment and placement of certain positions within an organization. This may include hiring or moving people into new roles including tracking of these roles, the skill set of the people fulfilling the new roles and other particulars about the person in order to match to these new roles. For example, each instance of fulfillment includes a process of updating and creating job descriptions, placing advertisements, interviewing, checking references and providing onboarding services for the new employee, as well as exit interviews when an employee is leaving a position.

Employers often struggle with conflicting recruitment models and the ability to find qualified people for a particular position. In fact, many employees to not have any comprehensive recruitment tools to find qualified people for an open position. Also, employers often struggle with formulating and communicating their own hiring needs. For example, many employers do not have the ability to assess enterprise-wide data, or the means to leverage social networks to locate the best candidates. This makes it difficult to develop an effective talent pipeline, speed the hiring process, and successfully onboard new employees.

SUMMARY

In a first aspect of the present disclosure, a method includes: obtaining, by a computer system, one or more profiles from one or more data sources; analyzing, by the computer system, the one or more profiles to parse attributes and find similarities or recurring occurrences in the parsed attributes; normalizing the parsed attributes based on at least one similarities and recurring occurrences; and matching the normalized attributes to attributes of an open position.

In another aspect of the present disclosure, a computer program product comprising one or more computer readable storage media having program instructions collectively stored on the one or more computer readable storage media, the program instructions executable to: search different databases to find most relevant profiles that have selected skills or skills similar to those in an initially selected profile; provide the most relevant profiles to a user; refine the search by feeding back into the search additional skills associated with the most relevant profiles and found during the search; find additional relevant profiles that match the additional skills; and provide the additional relevant profiles to the user.

In a further aspect of the present disclosure, a system comprises a processor, a computer readable memory, one or more computer readable storage media, and program instructions collectively stored on the one or more computer readable storage media, the program instructions executable to analyze a frequency of initial attributes in one or more selected profiles, define a new list of desired attributes based on the frequency of the initial attributes, and combine the initial attributes and common attributes from selected profiles to create search profiles to refine a search.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

DETAILED DESCRIPTION OF ASPECTS OF THE INVENTION

The present disclosure relates generally to systems and processes for position fulfillment and, more particularly, to systems and processes of identifying and matching human resources to an open employment position within an organization. In further embodiments, the systems and processes described herein may be used to build an accurate and complete job description for an open employment position within the organization. In any scenario, though, the systems and processes described herein provide many advantages over conventional capabilities including, amongst others, a simplified and efficient approach to build job descriptions and fill open employment positions within the organization.

In accordance with aspects of the present disclosure, the systems and processes described herein include searching one or more databases of professional profiles based on a set of attributes required for a certain employment position within an organization. Generally, the search begins with an identification of a known set of attributes (e.g., skills, previous experiences, events, courses, location, former jobs, etc.) that may be desirable for a particular position. In embodiments, the set of attributes may initially be obtained from a professional profile of a person that is known to be suitable for the open employment position. The initial search (e.g., set of attributes) may identify many professional profiles of interest, any of which may include additional or different desirable attributes for a person filling the open employment position. Accordingly, through an iterative process, the user can refine the search process by adding the newly found attributes and/or eliminating existing attributes. This process can continue until a profile of a person is found that matches the desired skill set(s) for a particular employment position. The set of attributes obtained during the search may also be used to build an accurate job description, which can then be used to create an advertisement campaign for the open employment position.

Advantageously, aspects of the present disclosure provide technical features which allow a user to conduct a search and refine search criteria for open employment positions within an organization. These technical features include providing normalized curriculum vitae (CV) (e.g., structured text) through the use of artificial intelligence and neural networks, in addition to searching capabilities that use the normalized CV and which can be refined by the user in an iterative process. For example, the technical features include refinement of a set of attributes or skill sets initially based on a known individual, and then expanded upon based on the search of that skill set.

More specifically, the technical features described herein makes it easy to leverage mobile and social tools to develop an effective talent pipeline, speed the hiring process, and successfully onboard new employees. The tool(s) provided herein provides a single point of access to integrate comprehensive recruiting technology for advanced recruiting initiatives. Whether recruiting for a thousand locations or only one, the technical features described herein provide a maximum recruiting reach, while supporting a tailored candidate experience, flexible workflow, and more. The technical features redefine recruiting technology with an all-in-one platform that puts the employer at an advantage in requirement efforts by being interactive and providing consistent hiring processes, while addressing organizational demands for speed, integration, quality of hire, and visibility.

Implementations of the present disclosure may be a system, a method, and/or a computer program product. The computer program product may include a computer readable storage medium (or media) having computer readable program instructions thereon for causing a processor to carry out aspects of the present disclosure.

Computing Infrastructure

Figure 1:
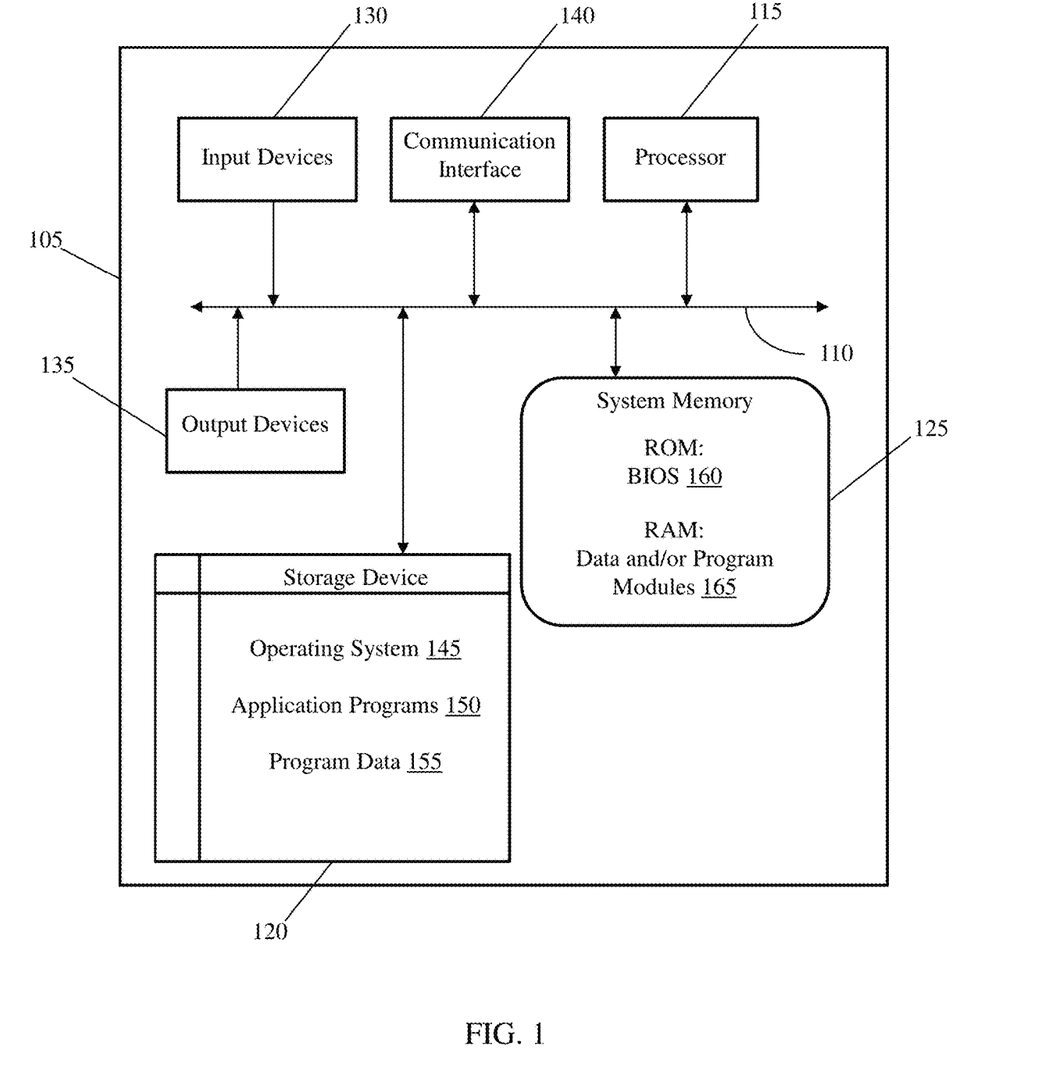
FIG. 1 is an illustrative architecture of a computing system implemented in accordance with aspects of the present disclosure.

FIG. 1 is an illustrative architecture of a computing system 100 implemented in embodiments of the present disclosure. The computing system 100 is only one example of a suitable computing system and is not intended to suggest any limitation as to the scope of use or functionality of the disclosure. Also, computing system 100 should not be interpreted as having any dependency or requirement relating to any one or combination of components illustrated in computing system 100.

Figure 2:
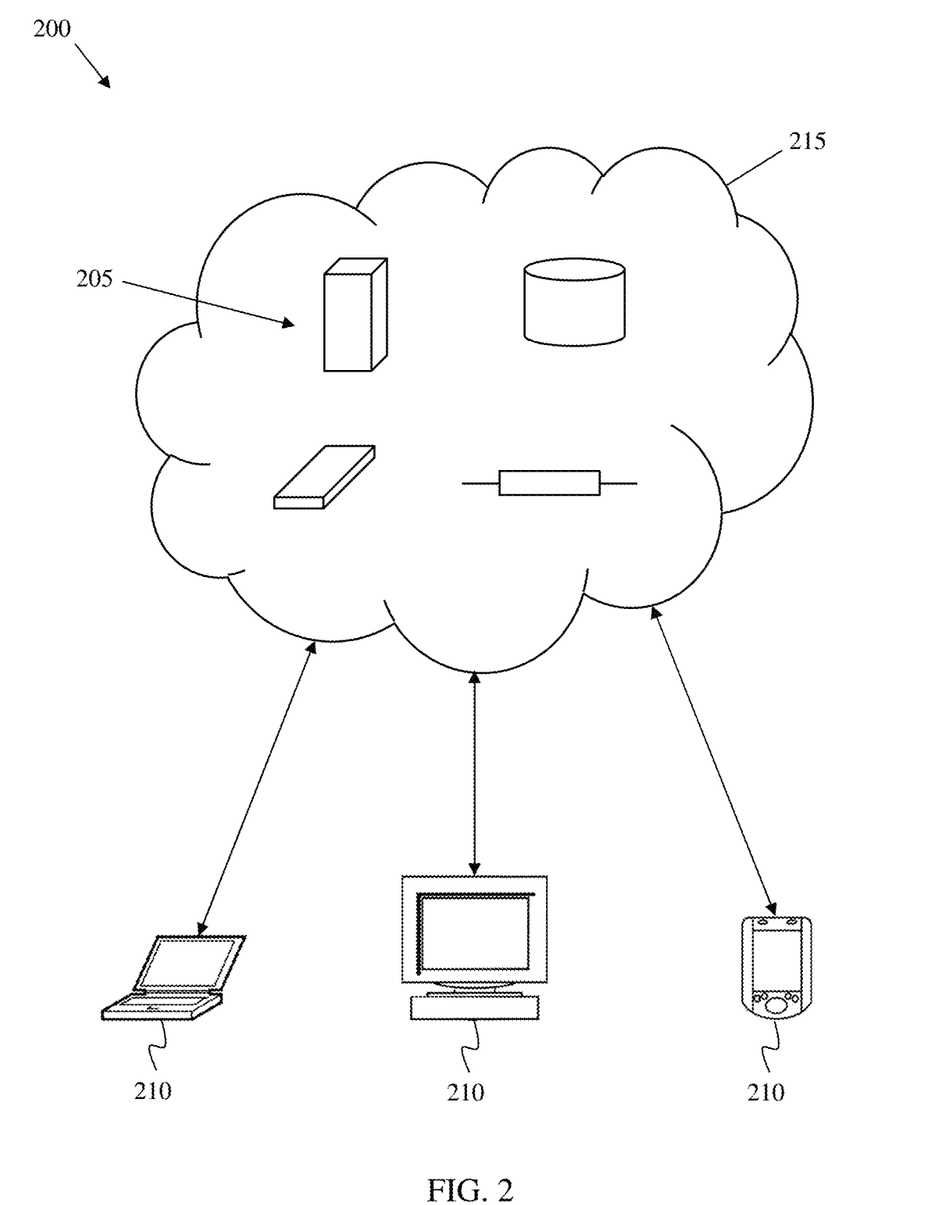
FIG. 2 shows an exemplary cloud computing environment in accordance with aspects of the present disclosure.

As shown in FIG. 1, computing system 100 includes a computing device 105. The computing device 105 can be resident on a network infrastructure such as within a cloud environment as shown in FIG. 2, or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present disclosure, which may be operatively implemented by the computer readable program instructions. For example, processor 115 enables the computing device 105 to identify and match human resources to an open employment position within an organization.

Illustratively, given one or more databases of professional profiles, processor 115 conducts an initial search based on a known person's skill set. The search can continue based on repeating certain steps until profiles are found that match the desired profile for the open position or until there are no profiles to return. The technical features which are implemented by processor 115 and as further described below, include for example:

(i) selecting or changing an initial set of desired attributes that are associated with a person that, perhaps, was previously in the open position or who is known to have certain skill sets that are desirable for the open position;

(ii) conducting a search in one or more databases for profiles that best match the attributes, and returning the results to the user. In embodiments, the databases can be any known database that store professional profiles such as, e.g., LinkedIn (LinkedIn is a registered trademark of LinkedIn Corp) or those serviced by ADP Corporation. For purposes of this description storage device 120 is representative of a database that stores profiles;

(iii) selecting one or more profiles that are deemed to be fit/relevant for the position;

(iii) aggregating the attributes of the selected profiles;

(iv) analyzing the frequency of the attributes in the selected profiles and defining a new list of desired attributes;

(v) combining the initial attributes and the common attributes (those with higher appearance rate) from selected profiles;

(vi) maintaining a history of the list of attributes and selected profiles for each iteration; and (vii) searching the database for profiles best matching the list of attributes, to return the list of desirable profiles.

In embodiments, processor 115 may receive input signals from one or more input devices 130 and/or drive output signals through one or more output devices 135. The input devices 130 may be, for example, a keyboard, touch sensitive user interface (UI), etc., as is known to those of skill in the art such that no further description is required for a complete understanding of the present disclosure. The output devices 135 can be, for example, any display device, printer, etc., as is known to those of skill in the art such that no further description is required for a complete understanding of the present disclosure.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present disclosure. In embodiments, storage device 120 may store operating system 145, application programs 150, and program data 155 in accordance with aspects of the present disclosure. In embodiments, application programs 150 are configured to perform the processes, steps, functions, and/or operations of the present disclosure.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to identify and match human resources to an open employment position within an organization. Alternatively, computing system can build job descriptions based on attributes of a plurality of different personal profiles. In particular, computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment.

In embodiments, an operator may interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry may be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

FIG. 2 shows an exemplary cloud computing environment 200 in accordance with aspects of the disclosure. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 may include one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

In embodiments, software and/or hardware that performs one or more of the aspects, functions and/or processes described herein may be accessed and/or utilized by a client (e.g., an enterprise or an end user) as one or more of SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment as described herein.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Illustrative Architecture

Figure 3:
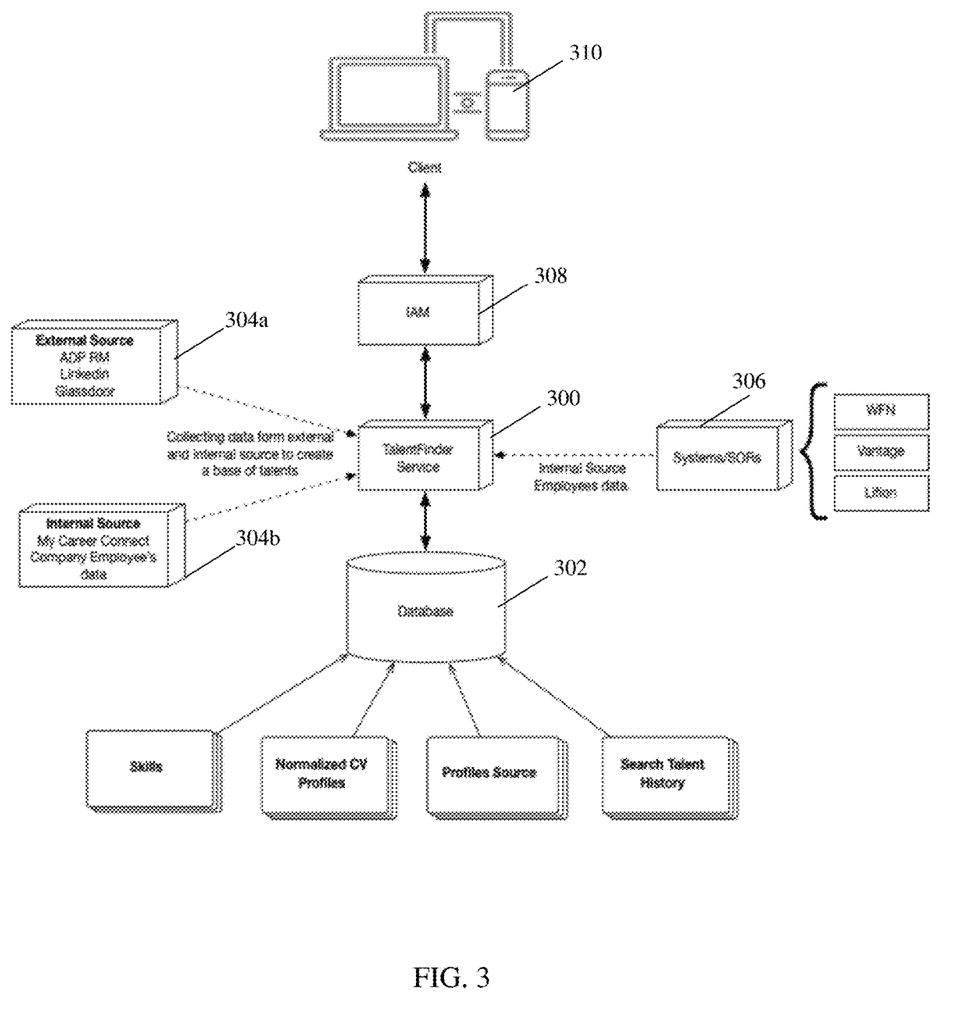
FIG. 3 shows a block diagram of an illustrative architecture in accordance with aspects of the present disclosure.

FIG. 3 shows a block diagram of an illustrative architecture in accordance with aspects of the present disclosure. More specifically, FIG. 3 shows a functional block diagram 300 that illustrates functionality in accordance with different aspects of the present disclosure. In embodiments, a service module 300 may perform the functions, steps and/or processes of the present disclosure. For explanation purposes only, the service module 300 may be described as a "Talent Finder Service"; although other descriptors are contemplated herein. Also, in embodiments, service module 300 may be representative of computing system 100 and/or computing device 105 shown in FIG. 1. It should also be understood that the service module 300 may be implemented in cloud infrastructure of FIG. 2.

Referring to FIG. 3, service module 300 is in communication with database 302. The database 302 may be representative of storage device 120 of FIG. 1. In embodiments, database 302 stores different employment information. For example, database 302 stores skills, profile sources, history of current and past searches and CV profiles, etc. As described in more detail below, CV profiles my be normalized CV profiles (e.g., structured text). As should be understood by one of ordinary skill in the art, a normalized profile is a structured text document which can then be more easily searched.

The service module 300 may collect data from both external sources 304*a*, internal sources 304*b* and other systems of record (SOR) 306. As should be understood by those of skill in the art, SOR is a data management term for an information storage system (commonly implemented on a computer system running a database management system) that is the authoritative data source for a given data element or piece of information. Any data found in these different sources may be stored in database 302.

In embodiments, external sources 304*a* may include LinkedIn, Glassdoor (Glassdoor is a registered trademark of Glassdoor, Inc), ADP Recruiting Management, etc. (ADP Recruiting Management is an all-in-one platform that a comprehensive recruiting technology for advanced recruiting initiatives.) The internal source 304*b* may include, for example, a company's own data sources. As illustrative, non-limiting examples, SOR 306 can be ADP Workforce Now (WFN), ADP Vantage HCM (Human Capital Management) and ADP Lifion. (WFN, HCM and Lifion are registered trademarks of ADP LLC.) Workforce Now (WFN) is an all-in-one platform for payroll and HR software, providing expert support and analytics for data-driven insights. ADP Vantage HCM is an enterprise-focused HCM used for payroll and related processes, such as timecards, scheduling, and PTO. ADP Lifion is a cloud-native HCM solution.

Still referring to FIG. 3, service module 300 interfaces with an identity and access management (IAM) module 308. The IAM module 308 provides search information obtained by service module 300 to a client 310. In embodiments, client 310 may be an external source as should be understood by those of skill in the art. For example, client 310 may include a user that initiated a search for an open employment position, which is performed by service module 300.

The modules shown in FIG. 3 may include additional or fewer modules than those shown. For example, in embodiments, separate modules may be integrated into a single module. Additionally, or alternatively, a single module may be implemented as multiple modules. Moreover, the quantity of devices and/or networks in the environment is not limited to what is shown in FIG. 3. In practice, the environment may include additional devices and/or networks; fewer devices and/or networks; different devices and/or networks; or differently arranged devices and/or networks than illustrated in FIG. 3.

Exemplary Flow Diagrams

Figure 4:
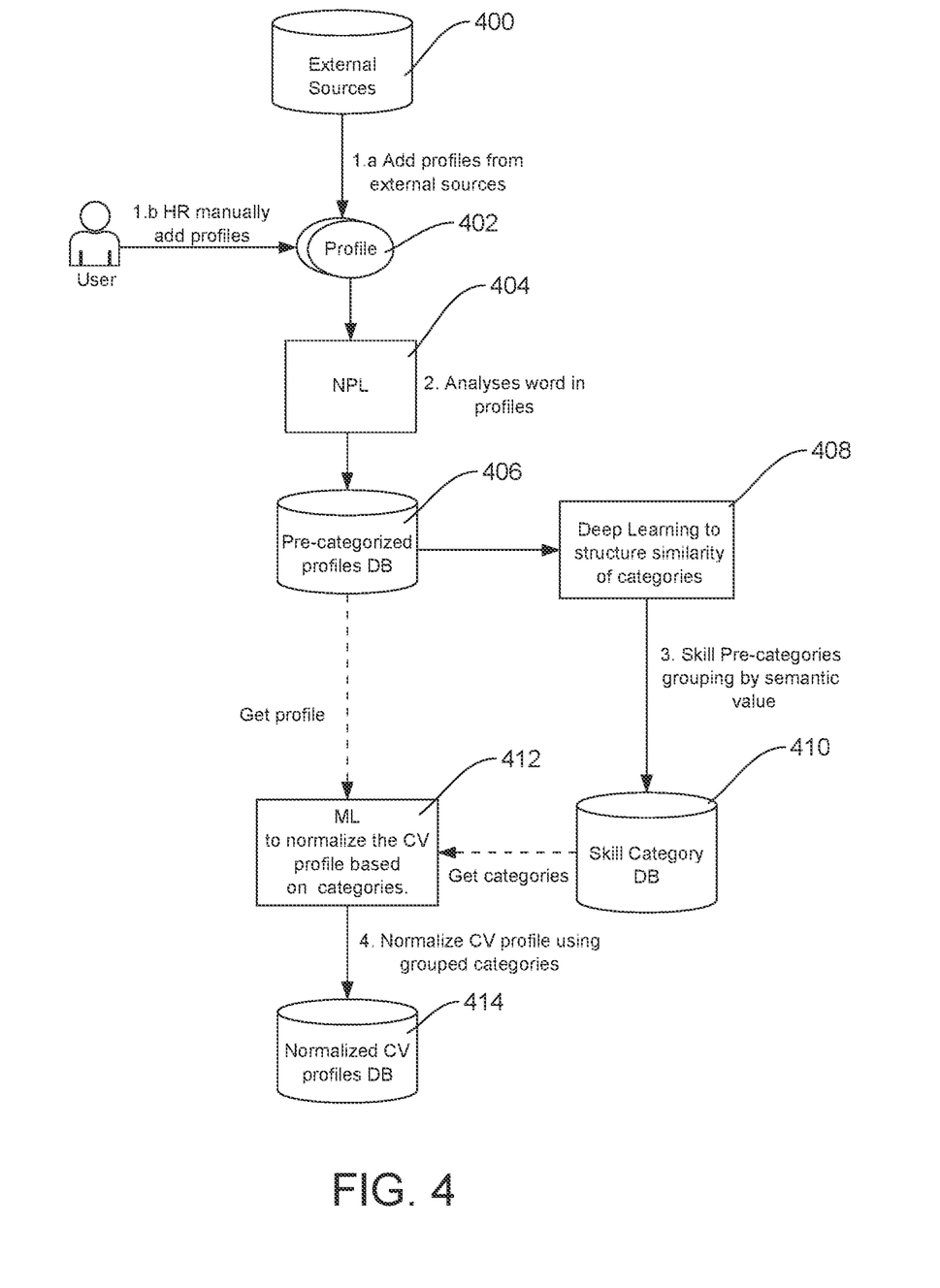
FIG. 4 shows a flow to create a normalized curriculum vitae (CV) profile database in accordance with aspects of the present disclosure.
Figure 5:
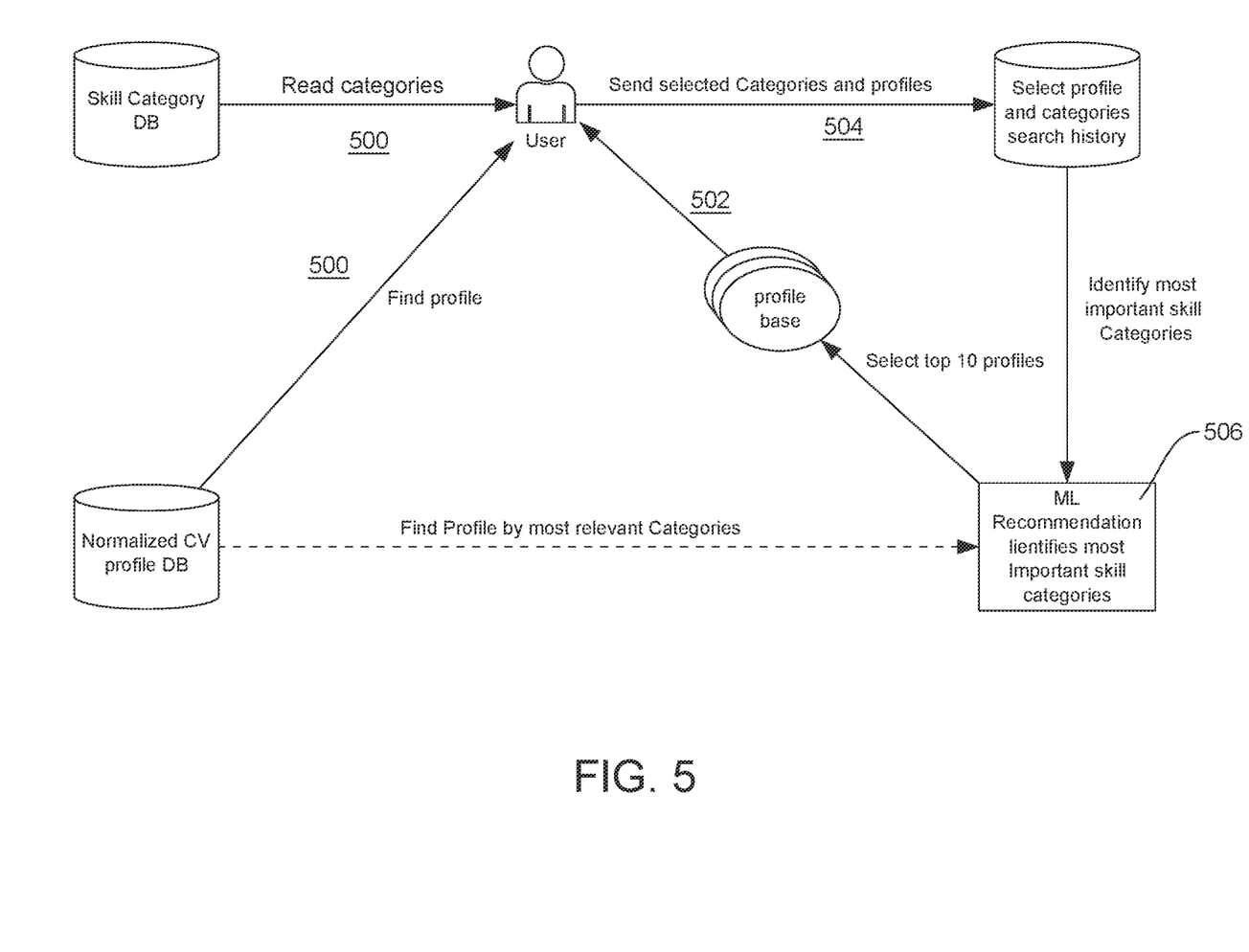
FIG. 5 shows a flow (and/or block diagram) associated with a search for an open position or to build a job description using the normalized CV profile database in accordance with aspects of the present disclosure.
Figure 6A:
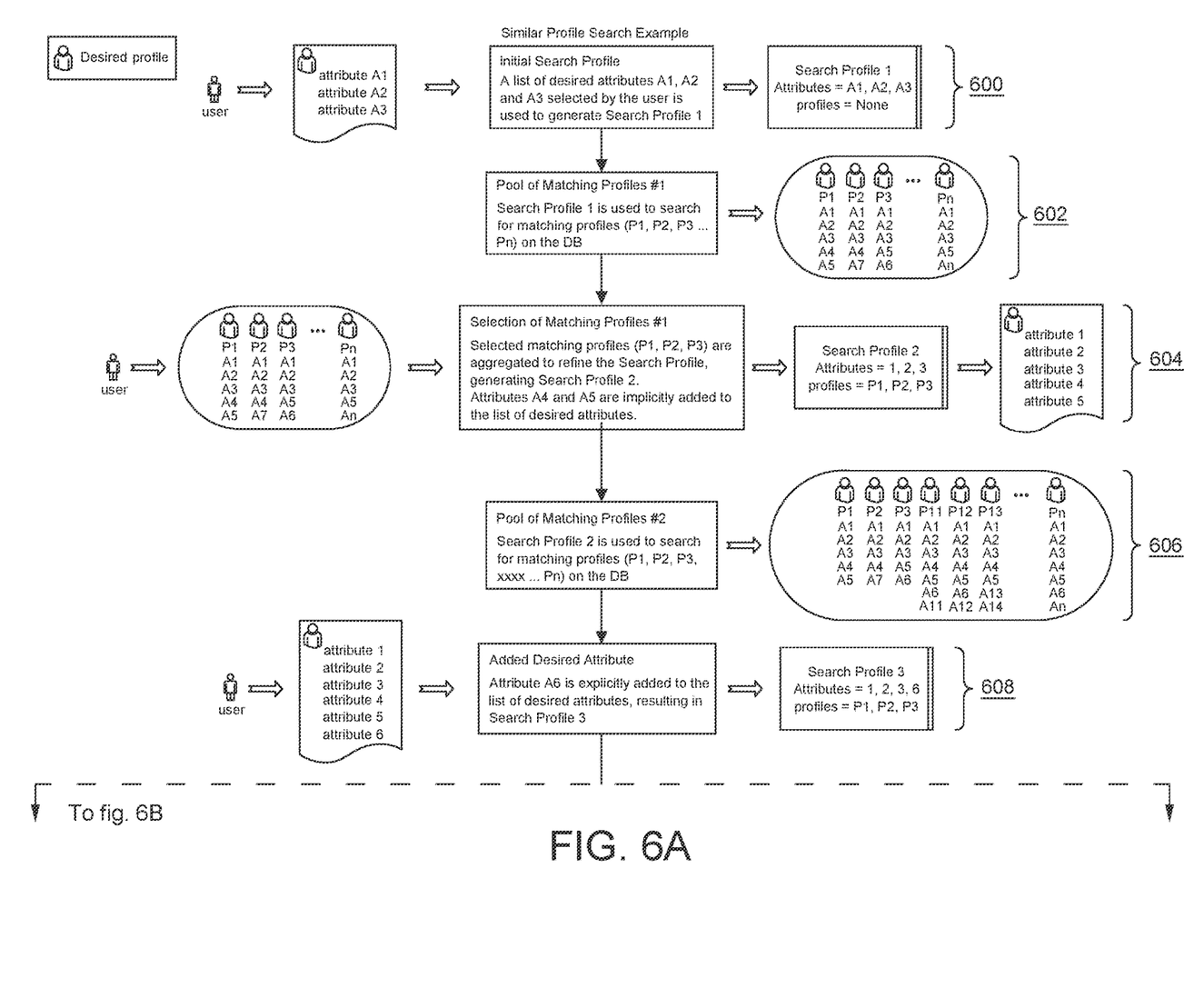
FIGS. 6A and 6B show a flow of an exemplary use case implementing the processes in accordance with aspects of the present disclosure.
Figure 6B:
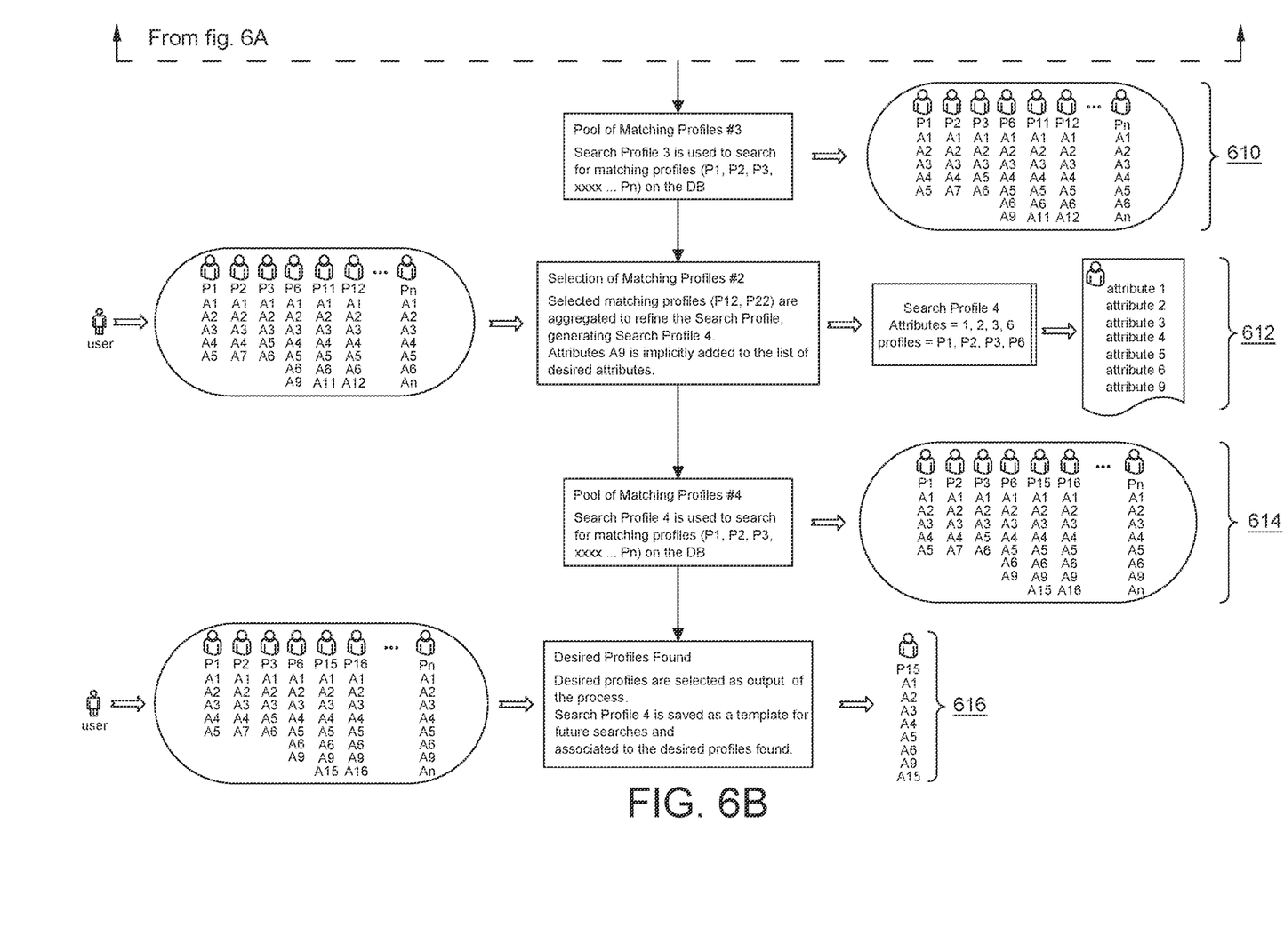

FIGS. 4-6 depict exemplary flows for processes in accordance with aspects of the present disclosure. The exemplary flows can be illustrative of a system, a method, and/or a computer program product and related functionality implemented on the computing system of FIG. 1 or architecture of FIG. 3, in accordance with aspects of the present disclosure. The computer program product may include computer readable program instructions stored on computer readable storage medium (or media). The computer readable storage medium may include the one or more storage medium as described with regard to FIG. 1, e.g., non-transitory media, a tangible device, etc.

The method, and/or computer program product implementing the flows of FIG. 4-6 can be downloaded to respective computing/processing devices, e.g., computing system of FIG. 1 or architecture of FIG. 3 as already described herein, or implemented on a cloud infrastructure as described with regard to FIG. 2. Accordingly, the processes associated with each flow of the present disclosure can be implemented by special purpose hardware-based systems that perform the specified functions or acts or carry out combinations of special purpose hardware and computer instructions.

More specifically, FIG. 4 shows a flow to create a normalized CV profile database in accordance with aspects of the present disclosure. At step 400, CVs (e.g., profiles) can be collected from any source, e.g., external source 304*a*, internal source 304*b* and source 306. In embodiments, the CVs are not structured text; instead, the CVs are initially provided in a free form using any known format and/or application. For example, the CV may be in word or Excel or other formatting. The CVs can be searched by, for example, using a known crawler or scraper such that no further explanation is required for a complete understanding of the present disclosure. In addition, CVs (profiles) can be entered manually at step 402 to build an internal CV database of information.

At step 404, natural language processing (NL) analyzes the words in the CVs and finds matches/similarities using a natural language database, interpreting them and creating "skill pre-categories" for the skills listed in the CV. For example, the search can look at and extract keywords that may be associated with a skill set, which can be used to create a "skill category". Illustratively, the search can find keywords "containers" and "docker containers" in order to create two different "skill pre-categories", which later could be mapped to the same "skill category". As should be understood, NLP is a subfield of linguistics, computer science, and artificial intelligence concerned with the interactions between computers and human language, in particular how to program computers to process and analyze large amounts of natural language data. The result is a computer capable of "understanding" the contents of documents, including the contextual nuances of the language within them. The technology can then accurately extract information and insights contained in the documents as well as categorize and organize the documents themselves. The different "skill pre-categories" provided in step 404 can be saved in a database at step 406.

At step 408, a deep learning algorithm (e.g., using NLP) will be used to find similarities and recurring occurrences of the "skill pre-categories", grouping them by their semantic value and then creating a range of "skill categories" in a "skill category DB" at step 410. Following the same example, both "containers" and "docker" would be mapped to category "docker container" with id "A", and the algorithm would understand that both have the same meaning.

At step 412, using the information in the "skill category database", the process can look again at the profiles in any of the databases and from any of the sources to normalize the profiles based on the categories. The normalization process can be accomplished using machine learning processes, which would provide a document with structured categories as noted herein. By way of non-limiting illustrative example, the term "container" listed as a skill on a first CV can now be matched to a skill category "A" and added on the person's profile, which will now be indexed by category "A". The normalized profiles can then be stored in the normalized CV profile database at step 414. The normalized profiles can be used for searching attributes beneficial to a particular open position.

FIG. 5 shows a flow (and/or block diagram) associated with a search for an open position or to build a job description using the normalized CV profile database in accordance with aspects of the present disclosure. In essence, FIG. 5 can be used to provide a recommendation for an open employment position or to provide certain attributes that could be used to complete a job description for an open employment position.

More specifically, as shown in FIG. 5, given a set of desired skills from the skill category database or a set of existing profiles from the normalized CV profile database (step 500), the process, e.g., using a machine learning, searches the different databases and finds the top "X" most relevant profiles that have the selected skills or skills similar to those in the selected profiles (step 506) and sends the search to the user (step 502). For example, from 1000 profiles stored in the skill category database and/or normalized CV profile database, the process can provide a subset of the 10 most desirable skills. In embodiments, the process works by counting the number of occurrences of each skill (pre-categories) on each profile and returns the one with most matches.

From the returned profiles, the user can select one as the final result and finish the process, or select one or more to feed a selected profile database (step 504). The selected profile database is a temporary database that is initialized at the start of each recommendation process. Using the profiles in the selected profile database, the process can then execute the search again with a fresh set of profiles using the machine learning (step 506), which is again returned to the user (step 502). The user could also chose to add new "skill categories", either from the selected profile database or from one of the selected profiles, before running the search again. In this way, the process can provide a list of capable candidates that have a matching skill set to the open position. These skill sets can be similar to a skill set obtained from a person at the initial stages of the search, or could diverge significantly through the iterative searching process.

It should also be recognized that the search can begin with a previous search that is stored in a history database, e.g., starting at step 504. In embodiments, the previous search can include attributes, e.g., a skill set, similar to that needed for a new, open employment position. In this scenario, given the benefit of using of the past search, the user can be provided with help or assistance in devising a beginning search strategy.

FIGS. 6A and 6B show a flow of an exemplary use case implementing the processes in accordance with aspects of the present disclosure. In FIGS. 6A and 6B, it is noted that the professional profiles (employees, curriculum database, etc.), and sets of attributes (skills, previous experiences, events, courses, location, former jobs, etc.) are also provided within one or more databases as described herein. At step 600, a user can select or change an initial set of desired attributes (e.g., A1, A2, A3). In embodiments, the initial set of attributes may be associated with a particular person who is known to have attributes that may be beneficial for an open employment position. For example, at step 600, the process will use the attributes A1, A2, A3 to generate a search profile, e.g., search profile 1.

Continuing at step 602, the process searches the databases including, e.g., the normalized CV profile database, to find best matches of the attributes associated with the search profile, e.g., profile 1. The result of this search can then be returned to the user. The results may be associated with a plurality of candidates (profiles) P1 . . . Pn, each of which have attributes A1, A2, A3 in additional to other attributes A4 . . . An. The user can now select one or more profiles (P1, P2, . . . Pn) that the user deems fit/relevant for the position.

At step 604, the process can aggregate the attributes of the selected profiles P1, P2, . . . Pn. For example, the process will aggregate the attributes of the selected profiles P1, P2, P3 in order to refine the search profile, e.g., search profile 2. In this case, search profile 2 will include attributes A1, A2, A3, A4, A5, with attributes A4 and A5 being implicitly added by way of the selection of the new profiles.

At step 606, the new search profile 2 is used to search the one or more databases to find best matches of the attributes associated with the search profile, e.g., search profile 2. In this scenario, additional candidates (profiles) P11, P12 and P13 are found to match to the attributes of search profile 2. At step 608, the user can explicitly add new attributes, e.g., A6, to search profile 2 without having to select all of the attributes of a particular profile found in the search using search profile 2. This will result in a new search profile, e.g., search profile 3.

At step 610, the new search profile 3 is used to search the one or more databases to find best matches of the attributes associated with the search profile, e.g., search profile 3. This new search results in additional candidates (profiles) and attributes being obtained and sent to the user, based on search profile 3. At step 612, the process can aggregate the attributes of the selected profiles P1, P22 in order to refine the search profile, e.g., search profile 4. In this case, search profile 4 will implicitly include attribute A9.

At step 614, the new search profile 4 is used to search the one or more databases to find best matches of the attributes associated with the search profile, e.g., search profile 4. At step 616, a final result is provided to the user using search profile 4. The results will now include all of the candidates (profiles) that have been found by the search process and which will provide viable candidates for an open employment position. Similarly, the attributes associated with the candidates (profiles) can be used to build a job description for the open employment position. Moreover, at step 616, the user can save the search as a template which can be used as a basis for a new search for a new open position, or for further refining the search associated with the desired profiles found for an existing search.

Accordingly, the processes described herein analyze the frequency of the attributes in the selected profiles, define a new list of desired attributes, and combine the initial attributes and the common attributes (those with higher appearance rate) from selected profiles to create new search profiles in order to refine a search. Moreover, the processes can maintain a history of the list of attributes and selected profiles for each iteration.

Exemplary Interfaces

Figure 7A:
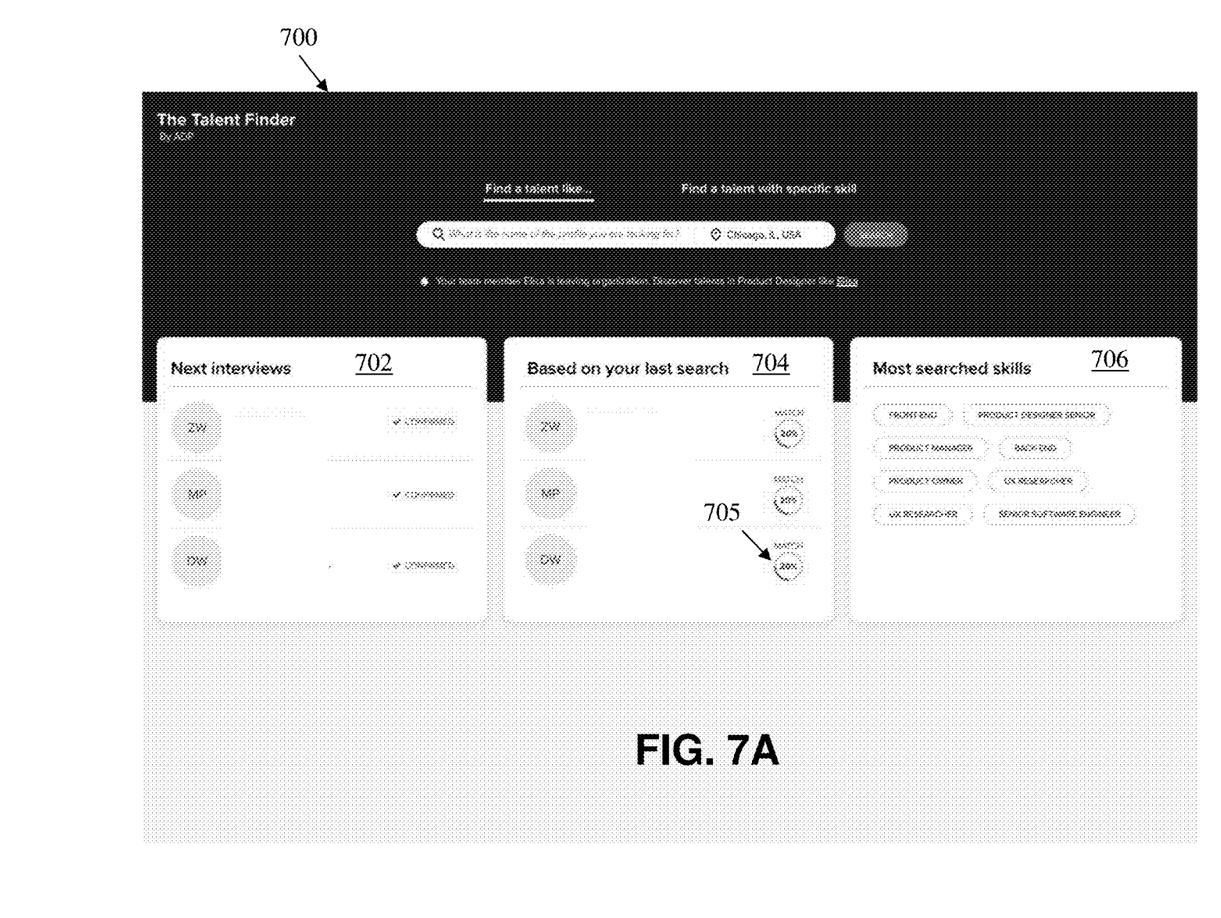
FIGS. 7A and 7B show exemplary interfaces which may be used to implement aspects of the present disclosure.
Figure 7B:
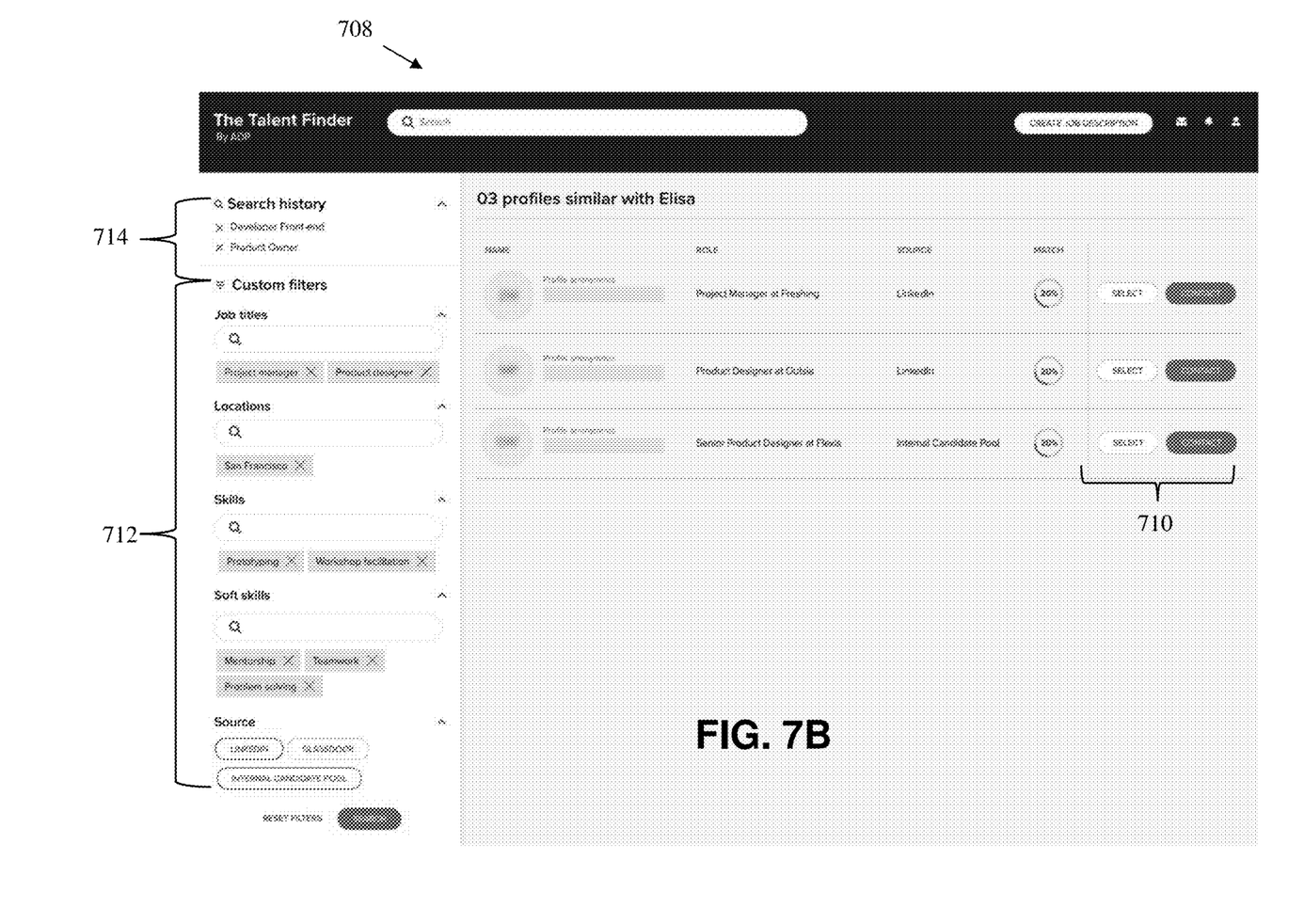

FIGS. 7A and 7B show exemplary interfaces which may be used to implement aspects of the present disclosure. For example, FIG. 7A shows a graphical user interface 700 that includes several information interfaces 702, 704, 706. In embodiments, information interface 702 includes a list of interviews and information interface 704 includes a list of candidates provided by a previous search. The information interface 704 can be automatically updated based on new profiles entered into the one or more databases described herein or, alternatively, found during a search. The information interface 704 also includes an icon 705 which indicates a percentage match to the search attributes for each candidate. This percentage match indication assists the user in determining the viability of the individual candidates. The information interface 706 can include the most common searched skills, e.g., attributes. In embodiments, the user can selected any of these most common searched skills in order to initiate or refine a new search.

FIG. 7B shows a graphical user interface 708 that includes several candidates that have a profile similar to a selected person, e.g., Elisa. In embodiments, the graphical user interface 708 can list the names of the candidates or maintain them as anonymous. The graphical user interface 708 further includes the current role of the candidate, the source used to obtain these candidates (e.g., LinkedIn, internal database, etc.) and, again, a percentage match to the search attributes. The graphical user interface 708 further includes icons to select and/or contact each candidate as shown at reference numeral 710. In further embodiments, the graphical user interface 708 provides filters which allow the user the ability to refine the search by, e.g., job title, location, and skills, as represented by reference numeral 712. The user can also select a history of searches at reference numeral 714.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method, comprising:
obtaining, by a computer system, a plurality of profiles from at least two data sources, wherein the plurality of profiles are provided in unstructured formats, the unstructured formats comprising a free form of different formats and applications;
parsing, by the computer system using natural language processing, the plurality of profiles to identify attributes in the plurality of profiles;
sorting, by the computer system, the plurality of profiles into skill categories based on similarities or recurring occurrences in the attributes;
displaying, by the computer system via a graphical user interface on a remote user device, an indication of the plurality of profiles sorted into the skill categories;
receiving, by the computer system via the graphical user interface, a selection of at least one profile of the plurality of profiles sorted into the skill categories;
generating, by the computer system responsive to the selection of the at least one profile via the graphical user interface, a list of attributes based on a frequency of occurrence of the attributes in the selected at least one profile;
normalizing, by the computer system using a neural network, the list of attributes based on one or more similarities and recurring occurrences in the plurality of profiles sorted into the skill categories, the normalizing of the list of attributes comprising converting, using the neural network, the plurality of profiles in the unstructured formats into structured text of a common format;
storing, by the computer system, the normalized list of attributes in a database;
receiving, by the computer system via the graphical user interface, a selection of a set of attributes that are associated with a user that was in an open position or has certain skill sets desirable for the open position;
executing, by the computer system, a search query in the database using the normalized attributes to identify a match of the normalized attributes to the set of attributes of the open position;
displaying, by the computer system via the graphical user interface displayed on the remote user device, an indication of the normalized attributes that match the set of attributes of the open position responsive to execution of the search query;
receiving, by the computer system, a second set of attributes that are associated with the user that was in the open position or has the certain skill sets desirable for the open position;
automatically updating, by the computer system, the indication of the normalized attributes that match the set of attributes to the open position;
displaying, by the computer system via the graphical user interface displayed on the remote user device, the updated indication of the normalized attributes that match the set of attributes to the open position;
receiving, by the computer system via the graphical user interface displayed on the remote user device, a selection of a filter configured to refine the display of the updated indication of the normalized attributes;
determining, by the computer system and based on the selected filter, a subset of the updated indication of the normalized attributes matching the filter;
automatically updating, by the computer system and via the graphical user interface displayed on the remote user device, the updated indication of the normalized attributes to display the subset of the updated indication of the normalized attributes responsive to the selected filter; and
responsive to identifying a plurality of new profiles entered into the at least two data sources, updating, by the computer system via the graphical user interface displayed on the remote user device, the subset of the updated indication of the normalized attributes, wherein updating comprises:
   automatically updating the subset of the updated indication of the normalized attributes based on accessing at least a first new profile of the plurality of profiles from a first data source of the at least two data sources; and
   automatically updating the subset of the updated indication of the normalized attributes based on accessing at least a second new profile of the plurality of profiles from a second data source of the at least two data sources.

2. The method of claim 1, wherein the at least two data sources comprise external sources, internal sources, and systems of record sources, and the method further comprising maintaining a history of the set of attributes and selected plurality of profiles for each iteration of the search query.

3. The method of claim 1, wherein the unstructured formats are different or disparate formats and wherein the normalized attributes are obtained by searching resumes on the Internet and building an internal resume database of information.

4. The method of claim 3, wherein the natural language processing extracts and analyzes words in the plurality of profiles and finds matches and similarities of the normalized attributes, wherein the natural language processing analyzes words in the resumes and finds the matches and similarities, interprets the matches and similarities, creates skill pre-categories for skills listed in the resumes, and wherein the natural language processing further comprises a deep learning algorithm to find the matches and similarities and recurring occurrences of the skill pre-categories, group the matches and similarities by semantic value, and create a range of skill categories in a skill category database.

5. The method of claim 4, wherein the natural language processing categorizes the matches and similarities into the skill pre-categories, and the method further comprising at least one of:
   refining the search query by adding newly found attributes; or
   eliminating existing attributes until a profile of a person is found that matches one or more desired skill sets for the open position.

6. The method of claim 5, wherein different skill pre-categories are mapped to a range of the skill categories.

7. The method of claim 6, wherein the range of skill categories comprise the normalized attributes.

8. The method of claim 7, wherein the matching the normalized attributes to the attributes of the open position comprises an iterative process.

9. The method of claim 8, wherein the iterative process includes combining additional attributes found during an initial search with common attributes.

10. The method of claim 1, further comprising creating templates comprising the normalized attributes.

* * * * *